United States Patent [19]

Schwander et al.

[11] 4,447,358
[45] May 8, 1984

[54] MONOAZO COMPOUNDS

[75] Inventors: Hansrudolf Schwander, Riehen; Peter Furrer, Bottmingen, both of Switzerland

[73] Assignee: Ciba-Geigy Corporation, Ardsley, N.Y.

[21] Appl. No.: 308,691

[22] Filed: Oct. 5, 1981

[30] Foreign Application Priority Data

Oct. 16, 1980 [CH] Switzerland ............... 7737/80

[51] Int. Cl.³ .................. C09B 29/08; C09B 29/26
[52] U.S. Cl. ........................................... 260/205
[58] Field of Search ................................ 260/205

[56] References Cited

U.S. PATENT DOCUMENTS

| | | | |
|---|---|---|---|
| 4,053,465 | 10/1977 | Kruckenberg | 260/207.3 |
| 4,189,427 | 2/1980 | Komorowski | 260/205 X |
| 4,237,048 | 12/1980 | Gottschlich et al. | 260/205 X |

FOREIGN PATENT DOCUMENTS

| | | | |
|---|---|---|---|
| 1020308 | 2/1966 | United Kingdom | 260/205 UX |
| 1343543 | 1/1974 | United Kingdom | 260/205 UX |
| 2002018 | 2/1979 | United Kingdom | 260/205 UX |
| 2005294 | 4/1979 | United Kingdom | 260/205 UX |
| 1561420 | 2/1980 | United Kingdom | 260/205 UX |

*Primary Examiner*—Paul F. Shaver
*Attorney, Agent, or Firm*—Edward McC. Roberts

[57] ABSTRACT

The invention provides novel monoazo compounds of the formula I

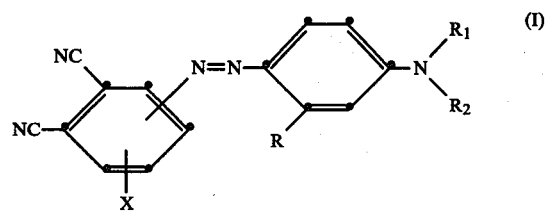

wherein X is hydrogen or halogen, R is hydrogen or $C_1$–$C_4$ alkyl, $R_1$ is $C_1$–$C_8$ alkyl, cycloalkyl or

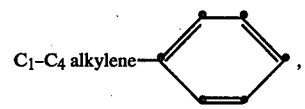

wherein the phenyl radical can be monosulfonated, and $R_2$ is $C_1$–$C_4$ alkyl which is unsubstituted or substituted by a sulfo group, or is cycloalkyl, with the proviso that either $R_1$ or $R_2$ contains a sulfo group.

The invention also provides a process for the production of the compounds of the formula I, as well as an intermediate of the formula IIb

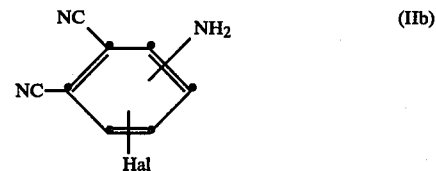

The novel monoazo compounds can be used as dyes for dyeing and printing textile material, especially wool and polyamide.

12 Claims, No Drawings

MONOAZO COMPOUNDS

The present invention relates to novel monoazo compounds, to the production thereof, and to the use thereof as dyes for dyeing and printing textile material, especially wool and polyamide. The invention further relates to novel amines.

The monoazo compounds of the invention have the formula I

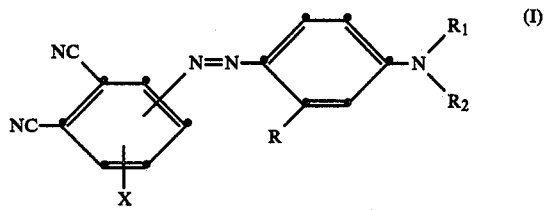

wherein X is hydrogen or halogen, R is hydrogen or $C_1-C_4$ alkyl, $R_1$ is $C_1-C_8$ alkyl, cycloalkyl or

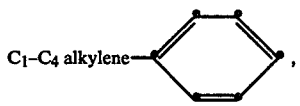

wherein the phenyl radical can be monosulfonated, and $R_2$ is $C_1-C_4$ alkyl which is unsubstituted or substituted by a sulfo group, or is cycloalkyl, with the proviso that either $R_1$ or $R_2$ contains a sulfo group.

A halogen atom X is a fluorine, chlorine, bromine or iodine atom, with bromine being preferred.

R as $C_1-C_4$ alkyl is branched, but preferably unbranched, alkyl, for example methyl, ethyl, n-propyl or isopropyl, or n-butyl, sec-butyl or tert-butyl. In preferred monoazo compounds, R is hydrogen, methyl or ethyl.

$R_1$ as $C_1-C_8$ alkyl is both branched and unbranched alkyl, for example methyl, ethyl, n-propyl, isopropyl, n-butyl, sec-butyl or tert-butyl, n-pentyl, isopentyl, n-hexyl, n-heptyl, n-octyl, isooctyl, or 2-ethylhexyl. Suitable cycloalkyl radicals are those of average ring size which can be substituted by one or more alkyl groups of up to 4 carbon atoms, and are e.g. cyclopentyl, cyclohexyl or cycloheptyl, or also mono-, di- or trimethylcyclohexyl. Suitable phenylalkylene radicals containing 1 to 4 carbon atoms in the alkyl moiety are preferably benzyl or β-phenethyl, the phenyl nucleus of which can be substituted by a sulfo group. In preferred monoazo compounds, $R_1$ is a sulfobenzyl or β-sulfophenethyl radical.

$R_2$ as $C_1-C_4$ alkyl is e.g. branched or preferably unbranched alkyl, such as methyl, ethyl, n-propyl and isopropyl, or n-butyl, sec-butyl or tert-butyl. These alkyl radicals can be substituted by a sulfo group. In preferred monoazo compounds, $R_2$ is methyl or ethyl. A further identity of $R_2$ is cycloalkyl, which here too denotes radicals of average ring size which can be substituted by one or more alkyl groups of up to 4 carbon atoms. Examples of such radicals are cyclopentyl, cyclohexyl or cycloheptyl, or also mono-, di- or trimethylcyclohexyl.

The choice of the substituents $R_1$ and $R_2$ rests on the proviso that one of these substituents must contain a sulfo group, i.e. the $C_1-C_4$ sulfoalkyl radical $R_2$ can be combined with the following radicals $R_1$: $C_1-C_8$ alkyl, cycloalkyl or

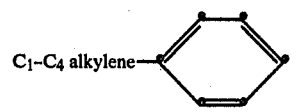

In a preferred combination, the substituents $R_1$ and $R_2$ have the following meanings:

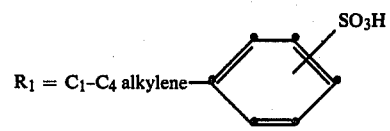

and $R_2 = C_1-C_4$ alkyl or cycloalkyl.

The alkylene moiety in the radical $R_1$ is preferably methylene or ethylene, and alkyl and cycloalkyl radicals $R_2$ are preferably methyl, ethyl and cyclohexyl.

The azo bridge can be both ortho- and para-positioned to the two cyano substituents of the diazo component. It is preferred that the azo bridge is in the para-position to one of the two cyano radicals.

Preferred monoazo compounds are those of the formula Ia

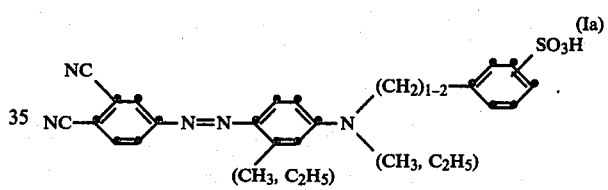

Particularly preferred monoazo compounds are those of the formulae Ib, Ic and Id

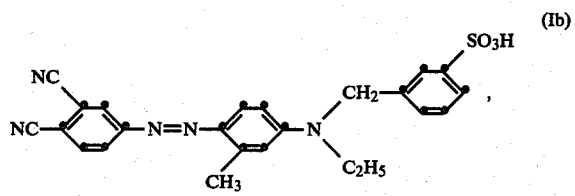

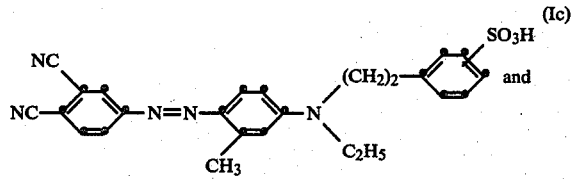

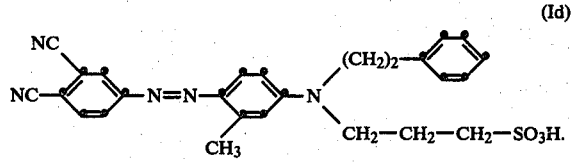

The monoazo compounds of the formula I can be obtained in a manner known per se, for example by diazotising an amine of the formula II

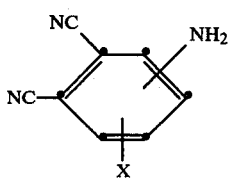

and coupling the diazo compound with a coupling component of the formula III

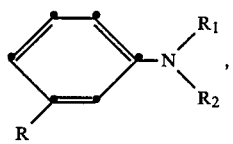

in which formulae X, R, $R_1$ and $R_2$ have the given meanings.

The amines of the formula II, in which X is hydrogen, are known (formula IIa) and are prepared by known methods [BIECHLER, Comptes Rendus 200, 141 (1935)]. The amines of the formula II, in which X is halogen, are novel and constitute a further object of the invention. They have the formula IIb

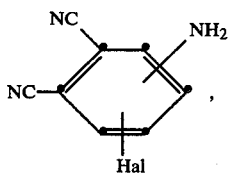

wherein Hal is a halogen atom. The compounds of the formula IIb are obtained by methods which are known per se, e.g. the bromine derivatives by brominating amines of the formula IIa

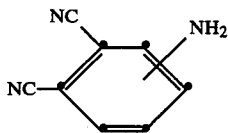

with elementary bromine. The novel amines of the formula IIb can be used in particular as diazo components for obtaining azo compounds.

A preferred process comprises diazotising a compound of the formula II, wherein X is hydrogen or bromine, and coupling the diazo compound to a coupling component of the formula III, in which R, $R_1$ and $R_2$ are as defined for formula III.

It is preferred to use a coupling component of the formula III, wherein $R_1$ is

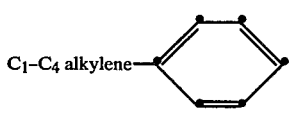

which can be substituted in the phenyl nucleus by a sulfo group, and $R_2$ is $C_1$–$C_4$ alkyl which can be substituted by a sulfo group, or is cycloalkyl, and wherein $R_1$ or $R_2$ contains a sulfo group and R is as defined for formula III.

Another preferred process comprises the use of a coupling component of the formula III, wherein $R_1$ is $C_1$–$C_8$ alkyl or cycloalkyl, $R_2$ is $C_1$–$C_4$ sulfoalkyl and R is as defined for formula III.

Preferred coupling components are those of formula III, wherein R is hydrogen, methyl or ethyl.

In the preferred diazo components of the formula II, the amino function is in the para-position to one of the two cyano radicals.

A particularly preferred process comprises the use of a coupling component of the formula III, wherein R is hydrogen, methyl or ethyl, $R_1$ is

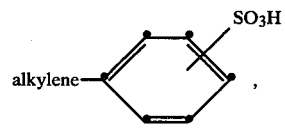

the alkylene moiety of which contains 1 to 2 carbon atoms, and $R_2$ is $C_2$–$C_4$ alkyl or cyclohexyl, or wherein $R_1$ is

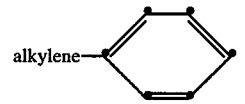

the alkylene moiety of which contains 1 to 2 carbon atoms, and $R_2$ is sulfoalkyl of 2 to 3 carbon atoms.

Another particularly preferred process comprises the use of a coupling component of the formula III, wherein R is hydrogen, methyl or ethyl, $R_1$ is $C_2$–$C_8$ alkyl or cyclohexyl, and $R_2$ is $C_2$–$C_3$ sulfoalkyl.

Particularly valuable monoazo compounds are obtained by diazotising 3,4-dicyanoaniline and coupling the diazo compound to N-ethyl-N-(3'-sulfobenzyl)-3-methylaniline, N-ethyl-N-sulfophenethyl-3-methylaniline or N-γ-sulfopropyl-N-phenethyl-3-methylaniline.

Illustrative examples of amines of the formula II are: 3,4-dicyanoaniline, 2,3-dicyanoaniline and brominated 3,4-dicyanoaniline.

The coupling components of the formula III are known and are prepared by known methods. Representative examples of the host of possible aniline derivatives which are suitable for use as coupling components are listed hereunder:
N-sulfobenzyl-N-ethyl-3-methylaniline
N-sulfobenzyl-N-ethylaniline
N-sulfobenzyl-N-n-propyl-3-methylaniline
N-sulfobenzyl-N-n-butyl-3-methylaniline
N-sulfobenzyl-N-n-butylaniline
N-sulfobenzyl-N-ethyl-3-ethylaniline
N-β-sulfophenethyl-N-ethylaniline
N-β-sulfophenethyl-N-ethyl-3-methylaniline
N-sulfobenzyl-N-cyclohexyl-3-methylaniline
N-benzyl-N-β-sulfoethylaniline
N-benzyl-N-β-sulfoethyl-3-methylaniline
N-benzyl-N-γ-sulfopropylaniline
N-benzyl-N-γ-sulfopropyl-3-methylaniline
N-cyclohexyl-N-β-sulfoethylaniline
N-cyclohexyl-N-β-sulfoethyl-3-methylaniline
N-cyclohexyl-N-γ-sulfopropylaniline
N-cyclohexyl-N-γ-sulfopropyl-3-methylaniline
N-(2-ethyl-hexyl)-N-β-sulfoethyl-3-methylaniline N-phenethyl-N-β-sulfoethylaniline
N-phenethyl-N-β-sulfoethyl-3-methylaniline
N-phenethyl-N-γ-sulfopropylaniline
N-phenethyl-N-γ-sulfopropyl-3-methylaniline
N-(3'-sulfobenzyl)-N-ethyl-3-methylaniline.

Both the diazotisation of the compound II and the coupling of the diazotised compound II with compound III are carried out by methods which are known per se [vide e.g. K. H. Schündehütte in Houben-Weyl, Vol. 10/3, pp. 213–465 (1965)].

The novel monoazo compounds of the formula I are used in particular as dyes for dyeing and printing textile material which can be dyed with anionic dyes, especially polyamide and wool. Dyeing can be performed by any of the continuous or discontinuous methods suitable for the corresponding substrate (e.g. exhaust, slop-padding or printing processes). The monoazo dyes of this invention have excellent migration properties and good covering of barriness. They also produce good results in combination dyeing with monosulfonic acid dyes with which dyeing is carried out at pH 5. The dyeings obtained on polyamide and wool with the dyes of formula I have good general fastness properties, in particular good wetfastness, good lightfastness, and good resistance to formaldehyde.

The textile material to be dyed can be in a very wide variety of processing forms, such as knits, wovens, yarns and fibres, as well as finished articles such as shirts.

The red dyeings produced on natural and synthetic polyamide material with the dyes of the formula Ia have good light- and wetfastness properties. In addition, these dyes have good migration, excellent build-up, good exhaust properties and good covering of barriness.

The following Examples illustrate the invention in more detail, but imply no restriction to what is described therein. Parts and percentages are by weight, unless otherwise stated.

EXAMPLE 1

The dropwise addition of 5 ml of 4 N sodium nitrite solution is made at 0°–2° C. to a mixture of 2.85 g of 3,4-dicyanoaniline, 30 ml of isopropanol and 6 ml of 36% hydrochloric acid. The diazo solution is stirred for 1 hour at 0°–2° C., then 0.4 g of urea is added, and stirring is continued for a further 15 minutes at the same temperature. This mixture is then added to a solution of 2/100 mole of the compound of the formula

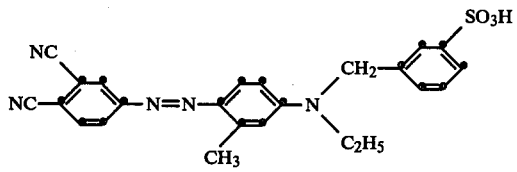

in the form of a solution of its sodium salt in 100 ml of water, cooled to 0°–2° C. The pH is adjusted to 3 by addition of ammonium acetate. When the coupling is complete, the coupling mixture is adjusted to pH 2.5 and the precipitated dye is isolated by filtration. The filter cake is then suspended in 100 ml of water and the pH is adjusted to 7 with aqueous sodium hydroxide. The dye of the formula

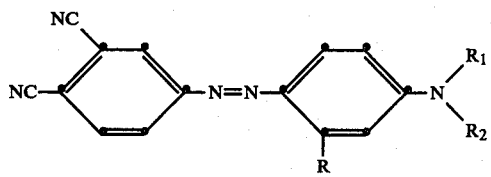

precipitated in the form of its sodium salt, is isolated by filtration and dried in vacuo at 70° C. The dye is obtained as a red powder which dissolves in water to form a red solution.

The red dyeings produced at pH 5 with this dye on polyamide have good fastness to light and wet processing. The dye has good migration properties, excellent build-up, good exhaust capacity and good covering of barriness, as well as good resistance to formaldehyde. A dye having similarly good properties is obtained by using 2,3-dicyanoaniline instead of 3,4-dicyanoaniline.

Carrying out the same procedure with equivalent amounts of the coupling components listed in Table 1 instead of the coupling components employed in this Example gives dyes of the formula

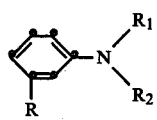

which dye polyamide from an acid bath in red shades of similarly good fastness properties.

TABLE 1

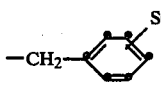

| No. | R | $R_1$ | $R_2$ | Shade on polyamide |
|---|---|---|---|---|
| 2 | H | —CH$_2$—⌬—SO$_3$H | —C$_2$H$_5$ | red |

TABLE 1-continued $$\underset{R}{\underset{|}{\bigcirc}}-N\underset{R_2}{\overset{R_1}{\diagup}}$$

| No. | R | R₁ | R₂ | Shade on polyamide |
|---|---|---|---|---|
| 3 | —CH₃ | —CH₂—C₆H₄—SO₃H | —C₃H₇—n | red |
| 4 | —CH₃ | —CH₂—C₆H₄—SO₃H | —C₄H₉—n | red |
| 5 | —C₂H₅ | —CH₂—C₆H₄—SO₃H | —C₂H₅ | red |
| 6 | H | —CH₂—CH₂—C₆H₄—SO₃H | —C₂H₅ | red |
| 7 | —CH₃ | —CH₂—CH₂—C₆H₄—SO₃H | —C₂H₅ | red |
| 8 | —CH₃ | —CH₂—C₆H₄—SO₃H | —C₆H₁₁ | red |
| 9 | H | —CH₂—C₆H₅ | —CH₂—CH₂—SO₃H | red |
| 10 | —CH₃ | —CH₂—C₆H₅ | —CH₂—CH₂—SO₃H | red |
| 11 | H | —CH₂—C₆H₅ | —CH₂—CH₂—CH₂—SO₃H | red |
| 12 | —CH₃ | —CH₂—C₆H₅ | —CH₂—CH₂—CH₂—SO₃H | red |
| 13 | H | —CH₂—CH₂—C₆H₅ | —CH₂—CH₂—SO₃H | red |
| 14 | —CH₃ | —CH₂—CH₂—C₆H₅ | —CH₂—CH₂—SO₃H | red |
| 15 | H | —CH₂—CH₂—C₆H₅ | —CH₂—CH₂—CH₂—SO₃H | red |
| 16 | —CH₃ | —CH₂—CH₂—C₆H₅ | —CH₂—CH₂—CH₂—SO₃H | red |
| 17 | H | —C₆H₁₁ | —CH₂—CH₂—SO₃H | red |
| 18 | —CH₃ | —C₆H₁₁ | —CH₂—CH₂—SO₃H | red |

TABLE 1-continued

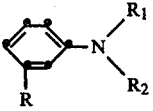

| No. | R | $R_1$ | $R_2$ | Shade on polyamide |
|-----|-----|-------|-------|---------------------|
| 19 | H | 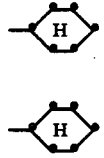 | $-CH_2-CH_2-CH_2-SO_3H$ | red |
| 20 | $-CH_3$ | (same cyclohexyl-H) | $-CH_2-CH_2-CH_2-SO_3H$ | red |
| 21 | $-CH_3$ | $-CH_2-CH-C_4H_9$<br>$\quad\quad\mid$<br>$\quad\quad C_2H_5$ | $-CH_2-CH_2-SO_3H$ | red |

EXAMPLE 22

A solution of 6.7 g of bromine in 5 ml of acetic acid is slowly added dropwise at room temperature to a mixture of 5.7 g of 3,4-dicyanoaniline, 3.6 g of sodium acetate and 25 ml of acetic acid. When the addition of bromine is complete, the mixture is further stirred at room temperature until no more educt can be detected in a thin-layer chromatogram. The acetic acid is then removed in vacuo in a rotary evaporator. The residue is taken up in warm water and the product is isolated by filtration. The filter cake is washed well with water and dried in vacuo at 70° C., affording bromo-3,4-dicyanoaniline as a grey product which dissolves in dimethyl formamide to give an almost colourless solution. A thin-layer chromatogram shows the product to be a mixture of isomers. $R_f$-values of the two main products: 0.43 and 0.55 respectively [determined on ready prepared silica gel plates 6 OF-254, MERCK Darmstadt; eluant:toluene/ethanol (4:1)].

EXAMPLE 23

5 ml of 4 N sodium nitrite solution are slowly added dropwise at 0°-2° C. to a mixture of 4.45 g of bromo-3,4-dicyanoaniline, 30 ml of dimethyl formamide and 6 ml of 36% hydrochloric acid. The diazo solution is stirred for 1 hour at 0°-2° C., then 0.4 g of urea is added, and stirring is continued for a further 15 minutes. The mixture is then added to a solution of 2/100 mole of the compound of the formula

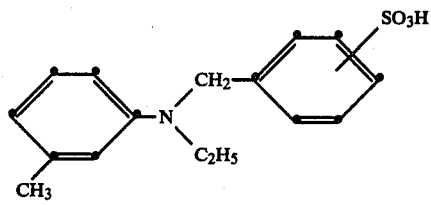

which is in the form of a solution of its sodium salt in 100 ml of water, cooled to 0°-2° C. The pH is adjusted to about 3 with ammonium acetate. When the coupling is complete, the pH is further lowered to 2.5 and the precipitated dye is isolated by filtration. The dye is then suspended in 100 ml of water and the pH of the suspension is adjusted to 7 with aqueous sodium hydroxide. The dye of the formula

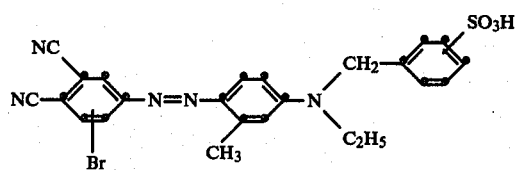

which is precipitated in the form of its sodium salt, is isolated by filtration and dried in vacuo at 70° C. The dye is obtained in the form of a red powder which dissolves in water to give a red solution. The bluish-red dyeings obtained with this dye on polyamide have good light- and wetfastness.

Varying the coupling component while repeating the same procedure gives the dyes listed in Table 2, which produce on polyamide dyeings of good fastness properties.

TABLE 2

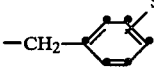

| No. | R | $R_1$ | $R_2$ | Shade on polyamide |
|---|---|---|---|---|
| 24 | H | —CH$_2$—C$_6$H$_4$—SO$_3$H | —C$_2$H$_5$ | red |
| 25 | H | —CH$_2$—C$_6$H$_4$—SO$_3$H | —C$_4$H$_9$—n | red |
| 26 | —CH$_3$ | —CH$_2$—CH$_2$—C$_6$H$_4$—SO$_3$H | —C$_2$H$_5$ | bluish-red |
| 27 | —CH$_3$ | —CH$_2$—C$_6$H$_4$—SO$_3$H | —C$_6$H$_5$ | bluish-red |
| 28 | —CH$_3$ | —CH$_2$—C$_6$H$_5$ | —CH$_2$—CH$_2$—SO$_3$H | bluish-red |
| 29 | —CH$_3$ | —CH$_2$—C$_6$H$_5$ | —CH$_2$—CH$_2$—CH$_2$—SO$_3$H | bluish-red |
| 30 | H | —CH$_2$—CH$_2$—C$_6$H$_5$ | —CH$_2$—CH$_2$—SO$_3$H | red |
| 31 | —CH$_3$ | —CH$_2$—CH$_2$—C$_6$H$_5$ | —CH$_2$—CH$_2$—SO$_3$H | red |
| 32 | H | —CH$_2$—CH$_2$—C$_6$H$_5$ | —CH$_2$—CH$_2$—CH$_2$—SO$_3$H | red |
| 33 | —CH$_3$ | —CH$_2$—CH$_2$—C$_6$H$_5$ | —CH$_2$—CH$_2$—CH$_2$—SO$_3$H | red |
| 34 | —CH$_3$ | —C$_6$H$_5$ | —CH$_2$—CH$_2$—SO$_3$H | bluish-red |
| 35 | —CH$_3$ | —C$_6$H$_5$ | —CH$_2$—CH$_2$—CH$_2$—SO$_3$H | bluish-red |

EXAMPLE 36

A dyebath is prepared from 4000 parts of water, 4 parts of ammonium acetate, 2 parts of the dye of Example 1, and acetic acid in an amount such that the bath has a pH of 6. Into this bath are then put 100 parts of synthetic polyamide tricot fabric. The bath is heated to the boil over half an hour and dyeing is performed for 45 minutes at 100° C. A non-barry red dyeing of good wetfastness properties is obtained.

EXAMPLE 37

100 parts of woollen knitting yarn are put at 50° C. into a bath consisting of 4000 parts of water, 2 parts of the dye of Example 1, 4 parts of ammonium sulfate and 2 parts of a levelling agent. The bath is brought to the boil over 45 minutes and kept for a further 45 minutes at boiling temperature. The goods are then removed, rinsed thoroughly and dried. The wool is dyed in a red shade of good fastness properties.

What is claimed is:

1. A monoazo compound of the formula I

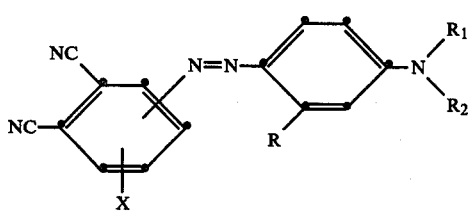 (I)

wherein X is hydrogen or halogen, R is hydrogen or $C_1$–$C_4$ alkyl, $R_1$ is $C_1$–$C_8$ alkyl, cycloalkyl or

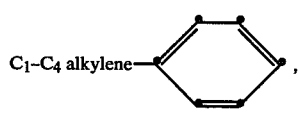

wherein the phenyl radical can be monosulfonated, and $R_2$ is $C_1$–$C_4$ alkyl which is unsubstituted or substituted by a sulfo group or is cycloalkyl, with the proviso that either $R_1$ or $R_2$ contains a sulfo group.

2. A monoazo compound according to claim 1, wherein X is hydrogen or bromine, and R, $R_1$ and $R_2$ are as defined in claim 1.

3. A monoazo compound according to claim 2, wherein $R_1$ is

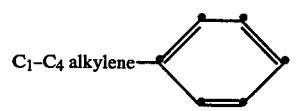

which can be substituted in the phenyl nucleus by a sulfo group, and $R_2$ is $C_1$–$C_4$ alkyl which can be substituted by a sulfo group, or is cycloalkyl, and wherein $R_1$ or $R_2$ contains a sulfo group, and R and X are as defined in claim 2.

4. A monoazo compound according to claim 2, wherein $R_1$ is $C_1$–$C_8$ alkyl or cycloalkyl, $R_2$ is $C_1$–$C_4$ sulfoalkyl, and R and X are as defined in claim 2.

5. A monoazo compound according to claim 3, wherein R is hydrogen, methyl or ethyl, and $R_1$, $R_2$ and X are as defined in claim 3.

6. A monoazo compound according to claim 1, wherein the azo bridge is bound in the para-position to one of the two cyano radicals.

7. A monoazo compound according to claim 5, wherein $R_1$ is

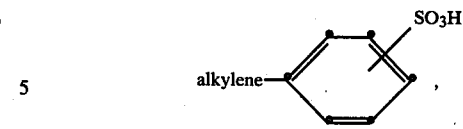

the alkylene moiety of which contains 1 to 2 carbon atoms, and $R_2$ is $C_2$–$C_4$ alkyl or cyclohexyl.

8. A monoazo compound according to claim 5, wherein $R_1$ is

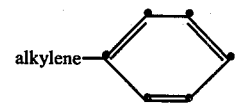

the alkylene moiety of which contains 1 to 2 carbon atoms, and $R_2$ is $C_2$–$C_3$ sulfoalkyl.

9. A monoazo compound according to claim 4, wherein R is hydrogen, —$CH_3$ or —$C_2H_5$, $R_1$ is $C_2$–$C_8$ alkyl or cyclohexyl, and $R_2$ is $C_2$–$C_3$-sulfoalkyl.

10. A monoazo compound according to claim 7 of the formula

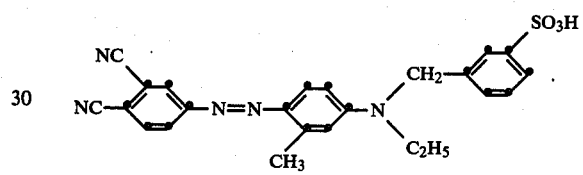

11. A monoazo compound according to claim 7 of the formula

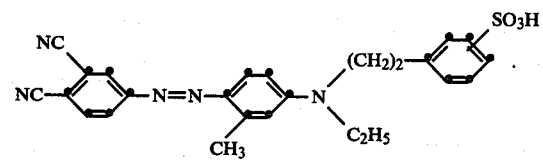

12. A monoazo compound according to claim 8 of the formula

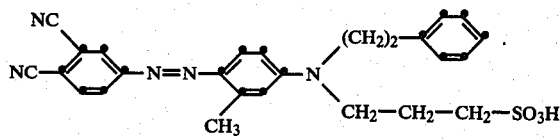

* * * * *